United States Patent
Yoshino

(10) Patent No.: US 7,525,580 B2
(45) Date of Patent: Apr. 28, 2009

(54) IMAGE PROCESSING APPARATUS, IMAGE PLAYING METHOD, IMAGE PICK-UP APPARATUS, AND PROGRAM AND STORAGE MEDIUM FOR USE IN DISPLAYING IMAGE DATA

(75) Inventor: Hiroaki Yoshino, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 573 days.

(21) Appl. No.: 11/005,291

(22) Filed: Dec. 6, 2004

(65) Prior Publication Data

US 2005/0128529 A1    Jun. 16, 2005

(30) Foreign Application Priority Data

Dec. 12, 2003    (JP)    ............................. 2003-415698

(51) Int. Cl.
H04N 5/225    (2006.01)
H04N 5/235    (2006.01)
H04N 5/76    (2006.01)
H04N 5/262    (2006.01)
H04N 5/222    (2006.01)

(52) U.S. Cl. .............................. 348/240.2; 348/207.99; 348/222.1; 348/231.2; 348/231.3; 348/240.99; 348/239; 348/333.01; 348/333.02; 348/333.11; 348/333.12

(58) Field of Classification Search ............ 348/333.05, 348/333.11, 333.01, 207.99, 222.1, 231.2, 348/231.6, 231.3, 240.99, 240.2, 239, 333.02, 348/333.03, 333.04, 333.12
See application file for complete search history.

(56) References Cited

U.S. PATENT DOCUMENTS

| | | | | |
|---|---|---|---|---|
| 6,657,658 | B2 * | 12/2003 | Takemura | 348/207.99 |
| 6,847,388 | B2 * | 1/2005 | Anderson | 715/854 |
| 7,034,880 | B1 * | 4/2006 | Endsley et al. | 348/333.11 |
| 7,239,348 | B2 * | 7/2007 | Miyazaki | 348/231.4 |
| 7,420,598 | B1 * | 9/2008 | Ito | 348/240.2 |
| 2002/0018072 | A1 * | 2/2002 | Chui | 345/667 |
| 2003/0174220 | A1 * | 9/2003 | Ito | 348/240.2 |

FOREIGN PATENT DOCUMENTS

| | | | |
|---|---|---|---|
| JP | 8-110578 | A | 1/1996 |
| JP | 11-331545 | A | 11/1999 |
| JP | 2000-354228 | A | 12/2000 |
| JP | 2001-094924 | A | 4/2001 |
| JP | 2001-157158 | A | 6/2001 |

* cited by examiner

Primary Examiner—David L Ometz
Assistant Examiner—Peter Chon
(74) Attorney, Agent, or Firm—Canon USA Inc. IP Division

(57) ABSTRACT

Upon continuously displaying a plurality of image data read from a recording medium, printing setting information including trimming information is set for the image data recorded to the recording medium with a corresponding relation to the image data. The displaying of the image data is controlled based on the determination of whether or not the printing setting information is set for each image data read from the recording medium.

15 Claims, 9 Drawing Sheets

FIG. 9A IMAGE AND TRIMMING INFORMATION

FIG. 9B AUTO-PLAY SCREEN

IMAGE PROCESSING APPARATUS, IMAGE PLAYING METHOD, IMAGE PICK-UP APPARATUS, AND PROGRAM AND STORAGE MEDIUM FOR USE IN DISPLAYING IMAGE DATA

CROSS REFERENCE TO RELATED APPLICATION

This application claims priority from Japanese Patent Application No. 2003-415698 filed on Dec. 12, 2003, which is hereby incorporated by reference herein.

BACKGROUND OF THE INVENTION

1. Field of the Invention

The present invention relates to an image processing apparatus having a recording function for picking-up an image and recording the image to a recording medium and an automatic playing function for sequentially reading the image recorded to the recording medium and automatically playing the image, an image playing method thereof, a program and a storage medium, and an image pick-up apparatus.

2. Description of the Related Art

As a recording medium having a solid-state memory device such as a memory card, an image processing apparatus, including a digital camera, has been put into the market to record a still image or a moving image to the recording medium and to play the image. One digital camera having a digital finder is used, including a color liquid crystal display (LCD) panel.

The above-mentioned digital camera has a function for continuously displaying the image before the image pick-up operation and determining the composition by a user and a function for playing and displaying the picked-up image and confirming the image. In particular, the function for playing the picked-up image just after the image pick-up operation is excessively convenient and, further, is advantageous for the user of the digital camera.

Further, another digital camera has a function for sending the image picked-up by the digital camera by connecting a printer to the digital camera without using any personal computer and for directly printing the image.

In addition, a slide show playing function is known to continuously play, automatically or manually, a plurality of still images that are picked-up by the digital camera and are recorded to the recording medium. Here, the slide show playing function enables the image to be read in accordance with the playing sequence that is preset or with the screen effect in the image display operation.

In addition, image playing apparatuses that trim-display an image are known.

However, it is complicated for the user to perform editing so as to set the playing sequence or screen effect by using a liquid crystal display panel or by using operating button(s) incorporated in the digital camera.

SUMMARY OF THE INVENTION

The present invention is made in consideration of the above-mentioned problems by providing an image processing apparatus, an image displaying method, and a program and a storage medium, in which the automatic displaying operation is effectively performed without a complicated setting operation.

According to one aspect of the present invention, there is provided an image processing apparatus for continuously displaying a plurality of read image data from a recording medium. The image processing apparatus includes: a trimming information setting unit that sets trimming information for cutting out a part of the image data recorded to the recording medium; and a display control unit that controls displaying of the image data upon displaying the plurality of image data recorded to the recording medium based on whether trimming information is set for each image data read from the recording medium.

According to an aspect of the present invention, an image displaying method, and a program and a storage medium corresponding to the above-mentioned image processing apparatus are disclosed.

Further, according to another aspect of the present invention, there is provided an image pick-up apparatus for recording, to a recording medium, image data obtained by picking-up an image of a subject and for continuously displaying a plurality of image data read from a recording medium. The image pick-up apparatus includes: a trimming information setting unit that sets trimming information for cutting out a part of the image data recorded to the recording medium; and a display control unit that controls displaying of the image data upon displaying the plurality of image data recorded to the recording medium based on whether the trimming information is set for each image data read from the recording medium.

Still further, according to another aspect of the present invention, there is provided an image processing apparatus for continuously displaying a plurality of read image data from a recording medium. The image processing apparatus includes: a printing-setting-information setting unit that sets printing setting information for printing the image data recorded to the recording medium with a corresponding relation to the image data; and a display control unit that controls displaying of the image data upon displaying the plurality of image data recorded to the recording medium based on the whether the printing setting information is set for each image data read from the recording medium.

According to the present invention, the trimming information for cutting out a part of the image recorded to the recording medium is set with a corresponding relation to the recorded image. Upon displaying the image recorded to the recording medium by the auto-play function, the display operation of the image is controlled in accordance with the determination whether or not the trimming information is set for each image read from the recording medium. As a consequence, the auto-play operation is advantageous without a complicated setting operation.

Further features and advantages of the present invention will become apparent from the following description of the embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE EMBODIMENTS

Embodiments of the present invention will be described with reference to the drawings.

First Embodiment

Figure 1:
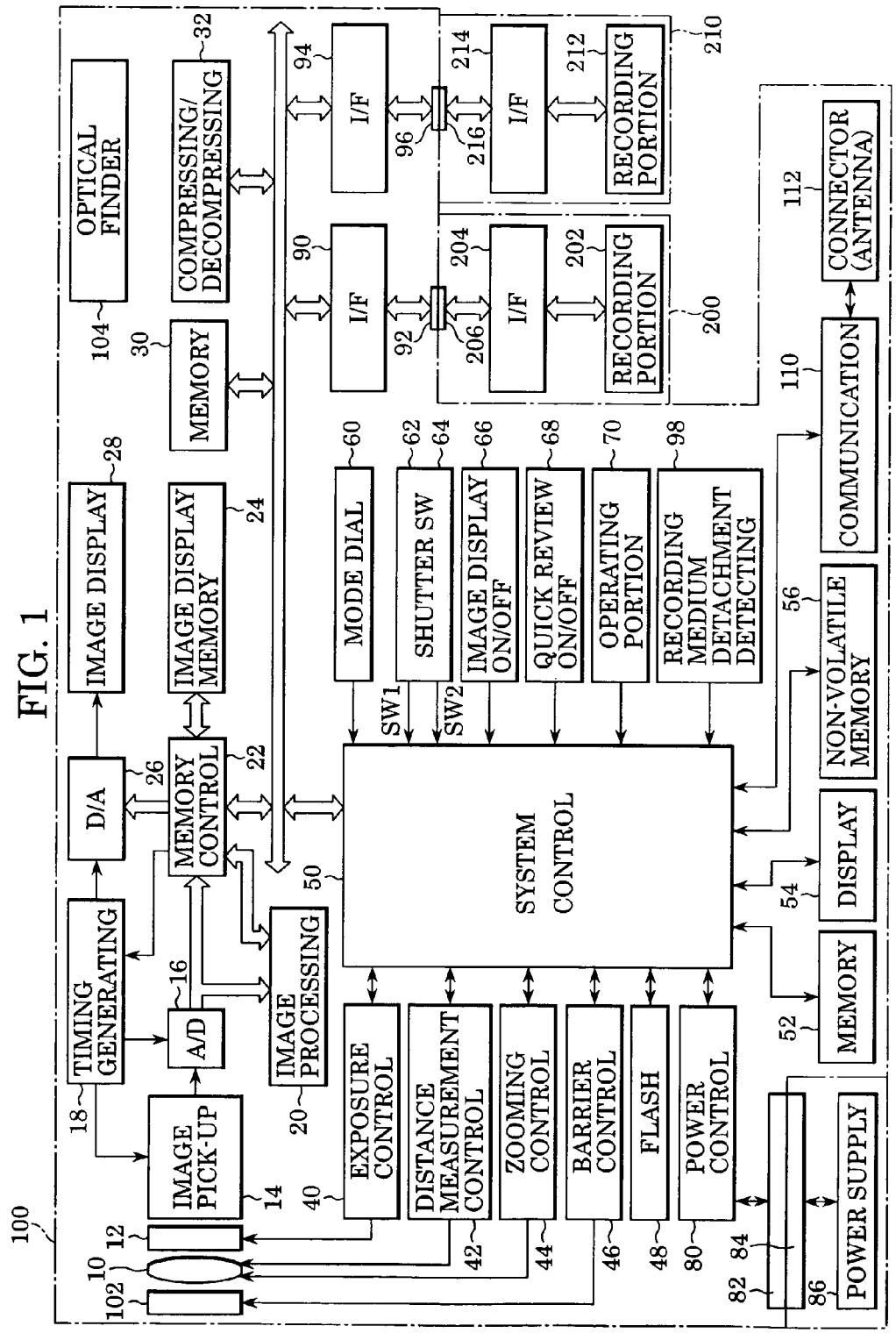
FIG. 1 is a block diagram showing the structure of an image processing apparatus according to the first embodiment of the present invention.

FIG. 1 is a block diagram showing the structure of an image processing apparatus according to the first embodiment of the present invention.

Referring to FIG. 1, an image processing apparatus 100 includes: an image pick-up lens 10; a shutter 12 having a stop function; an image pick-up device 14 that converts an optical image into an electric signal; an A/D (analog-to-digital) converter 16 that converts an analog signal output from the image pick-up device 14 into a digital signal; a D/A (digital-to-analog) converter 26; and an image processing circuit 20. A timing generating circuit 18 supplies a clock signal and a timing signal to the image pick-up device 14, the A/D converter 16, and the D/A converter 26. The operation of the timing generating circuit 18 is controlled by a memory control circuit 22 and a system control circuit 50.

The image processing circuit 20 performs predetermined pixel interpolation and color conversion of data from the A/D converter 16 and data from the memory control circuit 22. The image processing circuit 20 performs predetermined calculation by using image data that is picked-up. Based on the result obtained by the calculation, the system control circuit 50 controls TTL (through the lens)-system AF (auto-focus) processing, AE (auto exposure) processing, and flash by pre-emission processing which control an exposure control unit 40 and distance measurement control unit 42. Further, the image processing circuit 20 performs predetermined calculation by using the picked-up image data, and further performs TTL-system AWB (auto-white balance) processing based on the obtained calculating result.

The memory control circuit 22 controls the A/D converter 16, the timing generating circuit 18, the image processing circuit 20, an image display memory 24, the D/A converter 26, a memory 30, and a compressing/decompressing circuit 32. The data from the A/D converter 16 is written to the image display memory 24 or memory 30 via the image processing circuit 20 and the memory control circuit 22, or directly via the memory control circuit 22.

The image data for display operation written to the image display memory 24 is displayed on an image display portion 28 via the D/A converter 26. The image display portion 28 includes a TFT (thin film transistor) type liquid crystal display device, and realizes the digital finder function by sequentially displaying the image data picked-up by using the image display portion 28. Further, the image display portion 28 can be switched on/off in accordance with an instruction from the system control circuit 50. Upon switching off the display operation, the power consumption of the image processing apparatus 100 is excessively reduced.

The memory 30 is a memory for storing a still image or a moving image that is picked-up, and has a sufficient storage capacity for storing a predetermined number of still images or a moving image for a predetermined time. Thus, in the panorama photographing or the continuous pick-up operation for continuously picking-up a plurality of still images, an image with the large volume can be written to the memory 30 at the high speed. Further, the memory 30 provides a working area of the system control circuit 50.

The compressing/decompressing circuit 32 compresses or decompresses the image data by ADCT (adaptive discrete cosine transform). The data after the compression or decompression is written to the memory 30.

The shutter 12 is controlled by the exposure control unit 40. The exposure control unit 40 has a flash light adjusting function in association with a flash 48. The flash 48 has a light projecting function of the AF auxiliary light and a flash light adjusting function. The focusing of the image pick-up lens 10 is controlled by the distance measurement control unit 42. The zooming operation of the image pick-up lens 10 is controlled by a zooming control unit 44. The image pick-up lens 10 is protected by a protecting unit 102 as a barrier and the operation of the protecting unit 102 is controlled by a barrier control unit 46.

The exposure control unit 40 and the distance measurement control unit 42 are controlled by the TTL system. The system control circuit 50 controls the exposure control unit 40 and the distance measurement control unit 42 based on the calculating result of the image data picked-up by the image processing circuit 20. The system control circuit 50 controls the image processing apparatus 100 based on the constant, variable, and program for operation which are stored in a memory 52.

A display portion 54 displays an operating state or message by using a character, image, or sound in accordance with the execution of the program using the system control circuit 50. The display portion 54 includes a liquid crystal display device and a speaker, which are arranged to one or a plurality of positions for easily viewing the operating portion of the image processing apparatus 100, and are structured by combining an LCD, LED (light emitting diode), and sound device. A part of functions of the display portion 54 are arranged to an optical finder 104. Among the display contents of the display portion 54, the display data on the LCD includes single shot/continuous photographing indication, shutter speed indication, stop value indication, exposure correction indication, flash indication, red-eye preventing indication, macro photographing indication, buzzer setting indication, counting battery remaining indication, battery remaining indication, error indication, information indication using a plurality of digits of numbers, detaching state indication of the recording media 200 and 210, communication I/F operating indication, date and time indication, and the like. Among the display contents of the display portion 54, the display data of the optical finder 104 includes the display operation of focusing, of camera-shake alarming, of flash charge, of shutter speed, of stop value, and of exposure correction.

Connected to the system control circuit 50 are a non-volatile memory 56, a plurality of operating means for inputting various operating instructions of the system control circuit 50, power control unit 80, recording medium detachment detecting unit 98, and communication unit 110.

A plurality of operating means is structured by one or a plurality of a switch, dial, touch panel, pointing device for visual detection, and a sound recognizing device. For example, the plurality of operating means shown in FIG. 1 include a mode dial switch 60, a shutter switch (SW1) 62, a shutter switch (SW2) 64, an image display ON/OFF switch 66, a quick review ON/OFF switch 68, and an operating portion 70.

The mode dial switch 60 sets the switching operation of functional modes including power off, auto-photographing mode, photographing mode, panorama photographing mode, play mode, multi-screen play/erase mode, and PC connecting mode. The shutter switch (SW1) 62 is switched on during operating a shutter button (not shown), which causes instructing the AF (auto-focusing) processing, AE (auto-exposing) processing, AWB (auto-white balancing) processing, and processing of flash by pre-emission. The shutter switch (SW2) 64 is switched on upon ending the operation of the shutter button, which causes instructing the start of a series of operations including the exposing processing for converting the signal read from the image pick-up device 14 by the image processing circuit 20, writing the image data to the memory 30 via the memory control circuit 22, developing processing using the calculation by the image processing circuit 20 and the memory control circuit 22, and recording processing for reading the image data from the memory 30, compressing the data by the compressing/decompressing circuit 32, and writing the image data to the recording medium 200 or 210.

The image display ON/OFF switch 66 sets the on/off operation of the image display portion 28. In the photographing operation using the optical finder 104, the power supply to the image display portion 28 is shut off by the image display ON/OFF switch 66, which saves the power consumption. The quick review ON/OFF switch 68 sets a quick review function for automatically playing the image data that is photographed just after the photographing operation. According to the first embodiment, the quick review ON/OFF switch 68 includes a function for setting the quick review function when the image display portion 28 is switched off.

The operating portion 70 includes a touch panel and various buttons including a menu button, setting button, macro button, multi-screen play next page button, flash setting button, one-shot/continuous photographing/self-timer switching button, menu moving plus (+) button, menu moving minus (−) button, play image moving plus (+) button, play image moving minus (−) button, photographing image quality selecting button, exposure correcting button, and date/time setting button.

Power control unit 80 includes a battery detecting circuit, DC-DC converter, and a switch circuit for switching an energized block, detecting the presence or absence of battery attachment, type of battery, and battery remaining, controlling the DC-DC converter in accordance with an instruction of the system control circuit 50 and the detecting result, and applying a necessary voltage to blocks including the recording medium for a necessary period. The power is supplied from a power supply 86 to the power control unit 80 via connectors 82 and 84. The power supply 86 includes a primary battery, such as an alkaline battery or lithium battery, a secondary battery, such as a NiCd (Nickel Cadmium) battery, NiMH (Nickel Metal Hydride) battery, and Li (Lithium) battery, or an AC (Alternating Current) adapter.

The recording medium detachment detecting unit 98 detects whether or not the recording medium 200 or 210 is attached corresponding to connector 92 or 96. The connectors 92 and 96 are connected to interfaces (I/Fs) 90 and 94. The recording media 200 and 210 are recording media, such as a memory card or hard disk, and include recording portions 202 and 212, I/Fs 204 and 214, and connectors 206 and 216. The connector 206 is connected to the connector 92 and the connector 216 is connected to the connector 96.

According to the first embodiment, two interfaces and two connectors for attaching the recording media are provided. However, the number of interfaces or connectors is not limited to two and can be arbitrary. The interfaces and connectors may have the same standard or different standards. Further, the interfaces and connectors may be in the conformity of the standard of a PCMCIA card (Personal Computer Memory Card International Association (also called PC Cards)) or CF (Compact Flash®) card. Further, when the interfaces 90 and 94 and the connectors 92 and 96 use the standard in conformity of the PCMCIA card or CF card, the image data and management information in addition to the image data are transferred to another computer or peripheral device, such as a printer, by connecting communication cards such as a LAN (Local Area Network) card, modem card, USB (Universal Serial Bus) card, IEEE1394 card, P1284 card, SCSI (Small Computer System Interface) card, and PHS communication card.

The communication unit 110 has communication functions such as RS232C, USB, IEEE1394, P1284, SCSI, modem, LAN, and radio communication. The communication unit 110 has a connector 112 for connecting the image processing apparatus 100 to another device, such as a printer. In the case of radio communication, an antenna is provided in place of the connector 112.

A printer is connected to the image processing apparatus 100 according to the first embodiment. The image processing apparatus 100 includes a function for sending and directly printing the image picked-up by the image processing apparatus 100 together with the trimming information, enlargement/reduction printing information and printing setting information, such as the number of printing sheets. In order to accomplish the function, the printer connected to the image processing apparatus 100 includes a function for receiving the image picked-up by the image processing apparatus 100 and printing the received image. The functions of the image processing apparatus 100 include a function for setting the trimming information for cutting out a part of the printing image and printing it. The trimming information for cutting out a part of the display image is set by operating the key arranged to the operating portion 70 while displaying the corresponding image on the image display portion 28. The trimming information is set and then the set trimming information is stored in the recording medium 200 or 210 with a corresponding relation to the image. Specifically, the trimming information is written to a header portion of the image data. If the trimming information is linked to the image in the play operation, the trimming information may be recorded to another file of the image data with a corresponding relation.

The image processing apparatus 100 according to the first embodiment has a slide show (hereinafter, referred to an auto-play function) for reading a plurality of images recorded to the recording medium 200 or 210 and continuously playing the images automatically or manually. Upon playing the image recorded to the recording medium 200 or 210 by the slide show play function, the image display operation is controlled depending on the determination of whether or not the trimming information is set to each image read from the recording medium 200 or 210.

Figure 2:
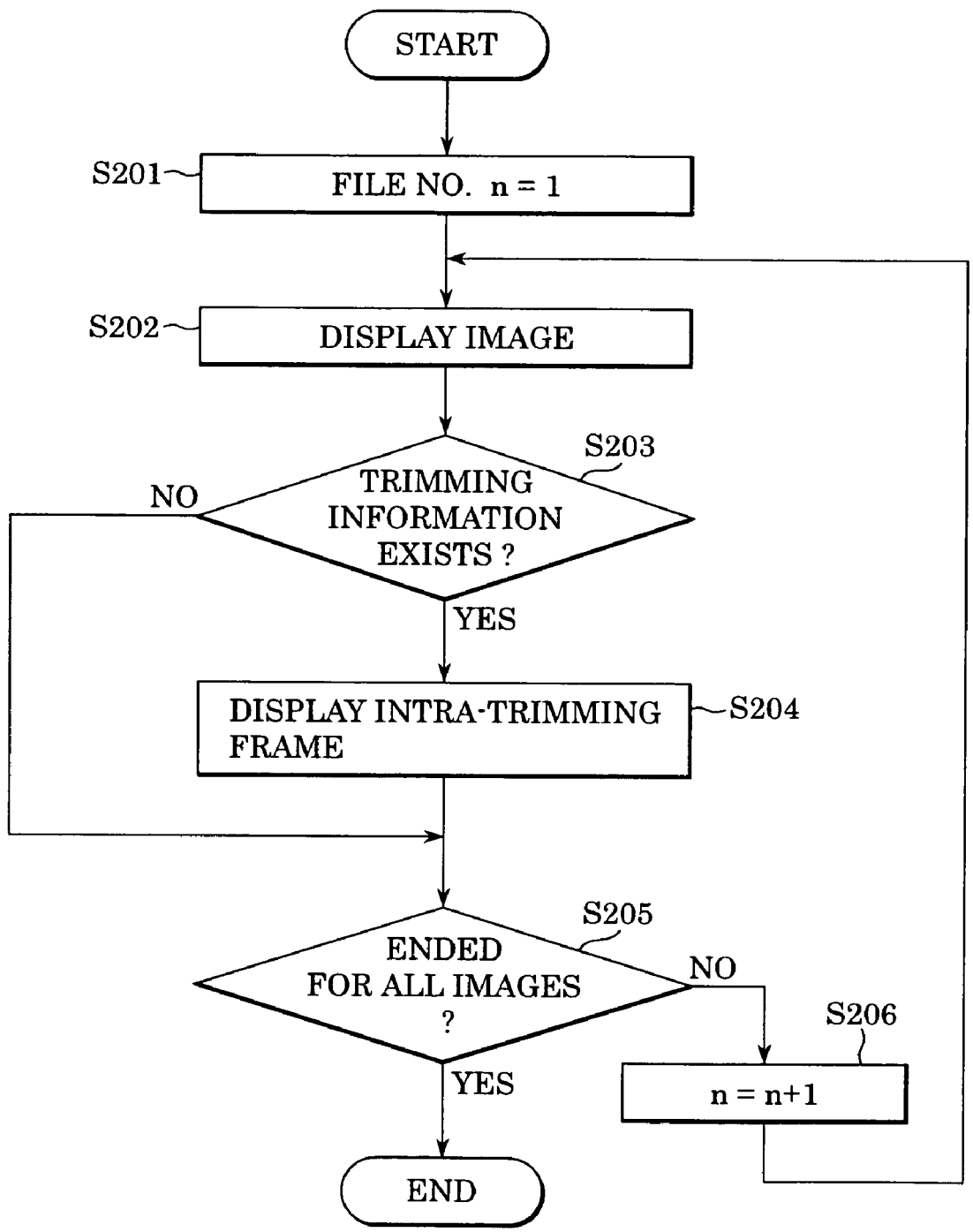
FIG. 2 is a flowchart showing the auto-play sequence using trimming information in an image processing apparatus shown in FIG. 1.
Figure 3:
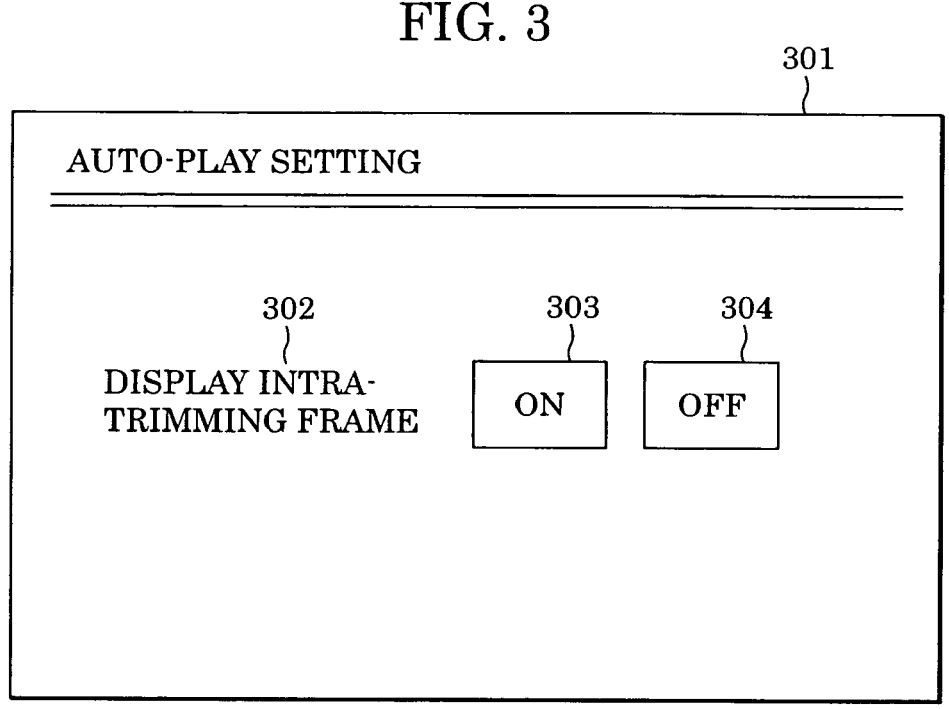
FIG. 3 is a diagram showing one example of a setting screen for setting whether or not the auto-play operation is performed by using the trimming information.
Figure 4:
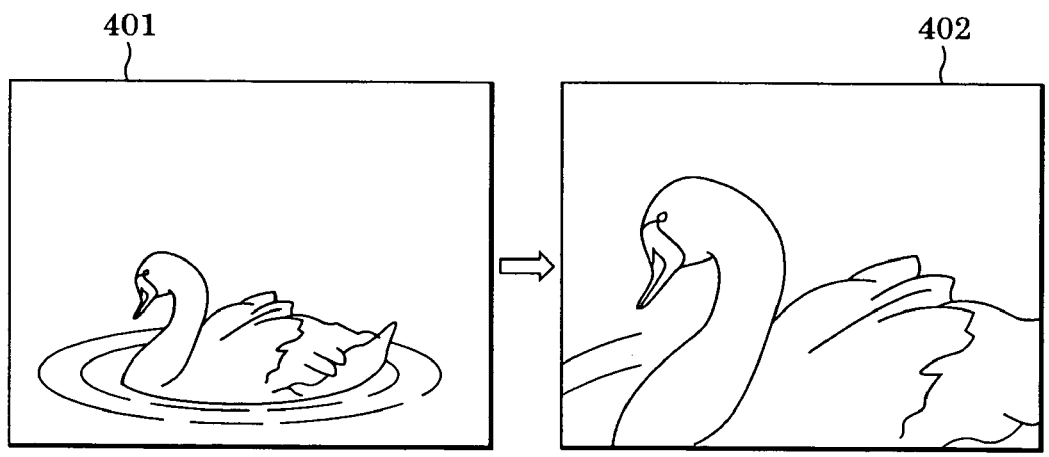
FIG. 4 is a diagram showing an example of the display operation of an intra-trimming frame by using the trimming information in the auto-play operation shown in FIG. 2.

Next, a description is given of the auto-play operation using the trimming information according to the first embodiment with reference to FIGS. 2 to 4. FIG. 2 is a flowchart showing the sequence for auto-play operation using the trimming information in the image processing apparatus 100 shown in FIG. 1. FIG. 3 is a diagram showing an example of a setting screen for determining whether or not the auto-play operation is performed by using the trimming information. FIG. 4 is a diagram showing an example of the display operation of an intra-trimming frame using the trimming information in the auto-play operation shown in FIG. 2. The sequence shown in FIG. 2 is executed based on the program stored in the memory 52 by the system control circuit 50.

Setting whether or not the auto-play operation is performed by using the trimming information on a setting screen 301 is shown in FIG. 3. The setting screen 301 displays a setting item (display the intra-trimming frame) 302 for setting whether or not the auto-play operation is performed by using the trimming information. An ON button 303 is used for setting the auto-play operation using the trimming information, and an OFF button 304 is used for resetting the auto-play operation. The user sets whether or not the auto-play operation is performed by using the trimming information on the setting screen 301.

A description is given of the play operation upon setting the auto-play operation using the trimming information on the setting screen 301. FIG. 2 illustrates the auto-play operation using the trimming information. In step S201, the system control circuit 50 sets the image as the processing target to the first one, namely, a file No. n to 1. In step S202, the system control circuit 50 displays the image of file No. n. Then, in step S203, the system control circuit 50 determines whether or not the trimming information is set to the image as the processing target. When the trimming information is set, in step S204, the system control circuit 50 enlarges and displays the image in an area prescribed by the trimming information set to the image as the current processing target, namely, the image in the trimming frame and then advances the processing to step S205. On the other hand, when the trimming information is not set, the system control circuit 50 skips step S204 and advances the processing to step S205.

In step S205, the system control circuit 50 determines whether or not the processing ends for all of the images. If it is determined that processing has ended for all of the images (yes in step S205), the system control circuit 50 ends the processing. However, if it is determined that processing has not ended for all of the images (no in step S205), in step S206, the system control circuit 50 increments the file No. n by one to automatically display the image of the next file No. n. The processing returns to step S202 and the system control circuit 50 displays the image of the file No. n. Incidentally, in the continuous play operation by the manual operation, the user presses the key disposed on the image operating portion 70 which increments the file No. n and displays the next image.

Referring to FIG. 4, in the auto-play operation, the entire image 401 of the corresponding file No. n is displayed in step S202. When the trimming information exists in the image 401 in step S203, the image in the area prescribed by the trimming information, namely, the image in the trimming frame is enlarged and is displayed as an image 402 in step S204.

According to the first embodiment, in the auto-play operation, for the image to which the trimming information is set, the image in the area prescribed by the trimming information, namely, the image in the trimming frame is enlarged and is displayed. Therefore, the auto-play operation is effective without the complicated setting operation.

According to the first embodiment, when the trimming information is set, the image in the area prescribed by the trimming information is enlarged and is displayed. According to another display method, for the image to which the trimming information is set, the display operation may have three steps. That is, first, the image before the trimming operation is played, only the image in the area continuously prescribed by the trimming information is then displayed, and the image in the area is enlarged and is displayed. Thus, it is easily understand which area of the original image is trimmed.

The image processing apparatus 100 according to the first embodiment has the system structure in which the printer is connected via the communication unit 110, and the image is sent to the printer together with the printing setting information such as the trimming information and can directly be printed without a personal computer. Further, the image processing apparatus 100 according to the first embodiment may have another system structure in which a digital camera is connected to the printer via the personal computer, the printing setting information such as the trimming information is set on application software operating on the personal computer, and the auto-play operation and auto-display operation can be performed by using the trimming information on an external monitor connected to the personal computer.

Second Embodiment

Figure 5:
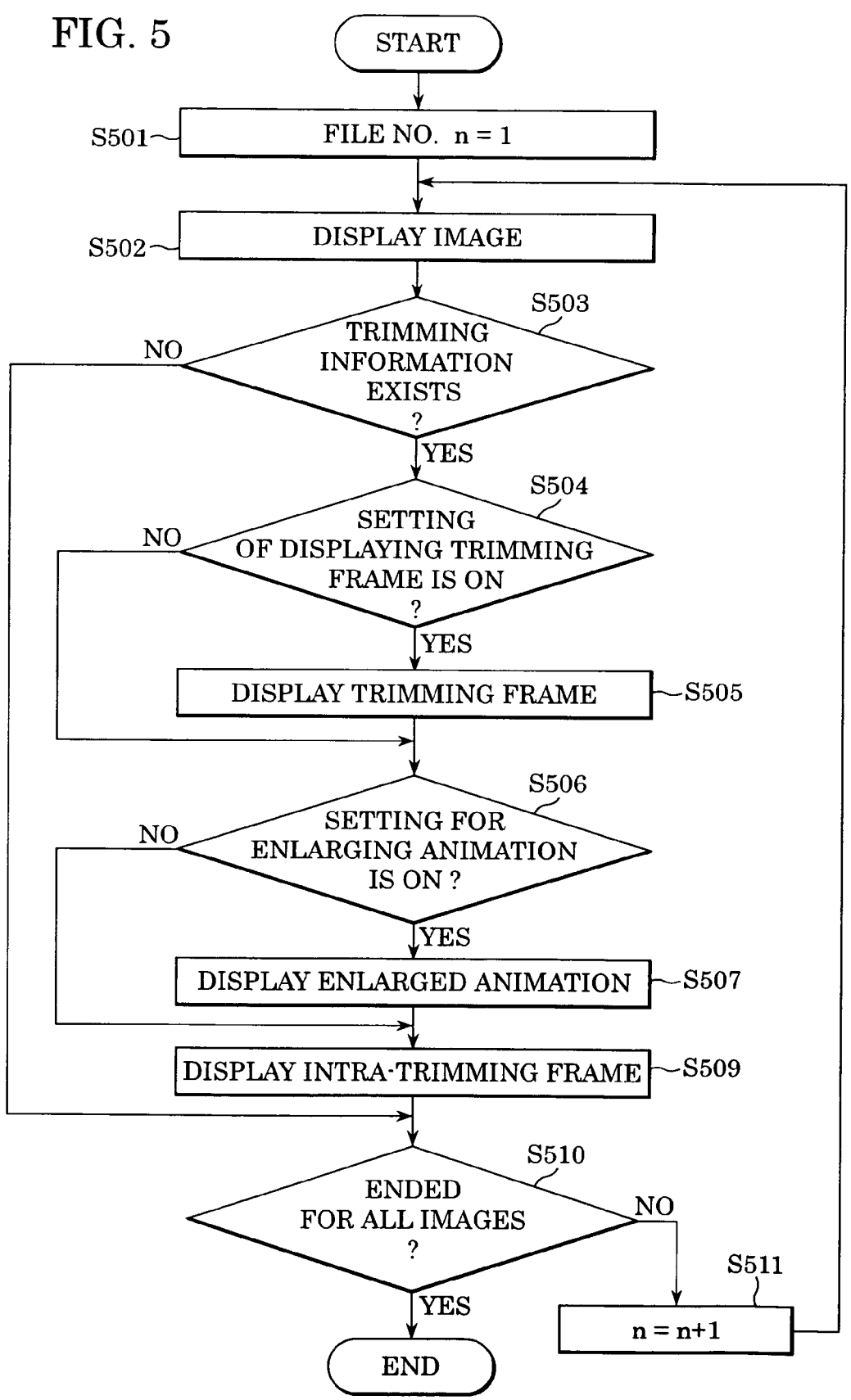
FIG. 5 is a flowchart showing the auto-play sequence using the trimming information in an image processing apparatus according to the second embodiment of the present invention.
Figure 6:
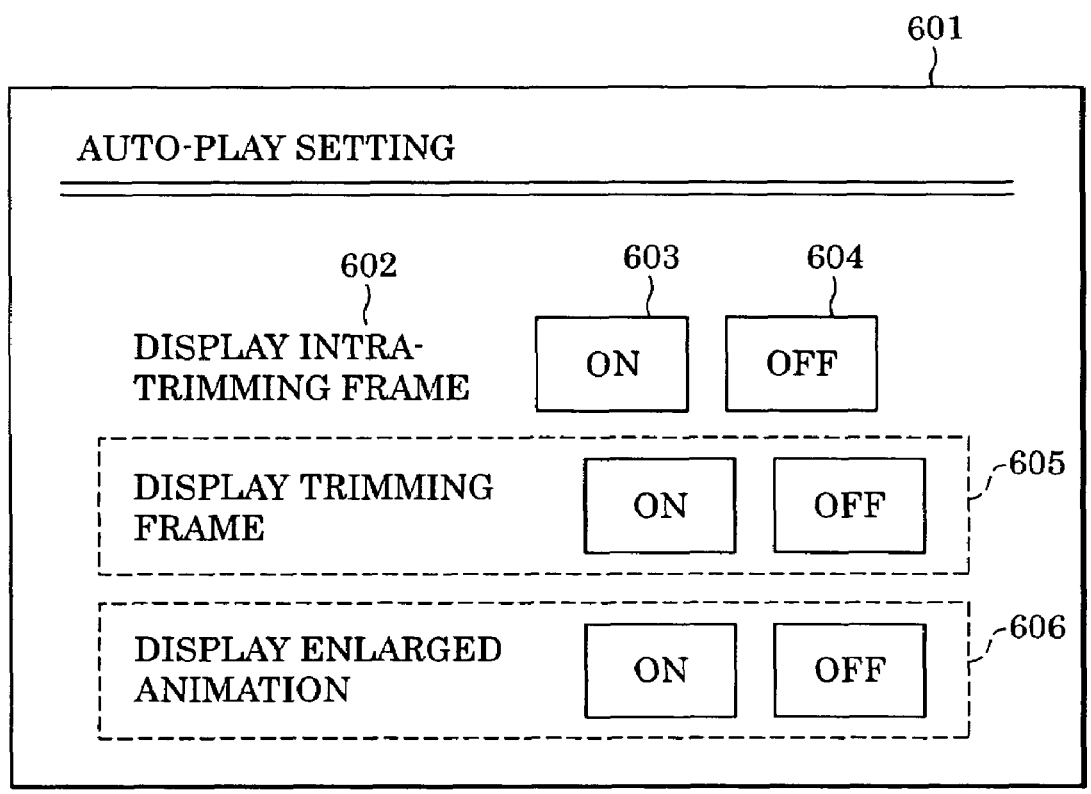
FIG. 6 is a diagram showing an example of a setting screen for setting whether or not the auto-play operation is performed by using the trimming information shown in FIG. 5.
Figure 7:
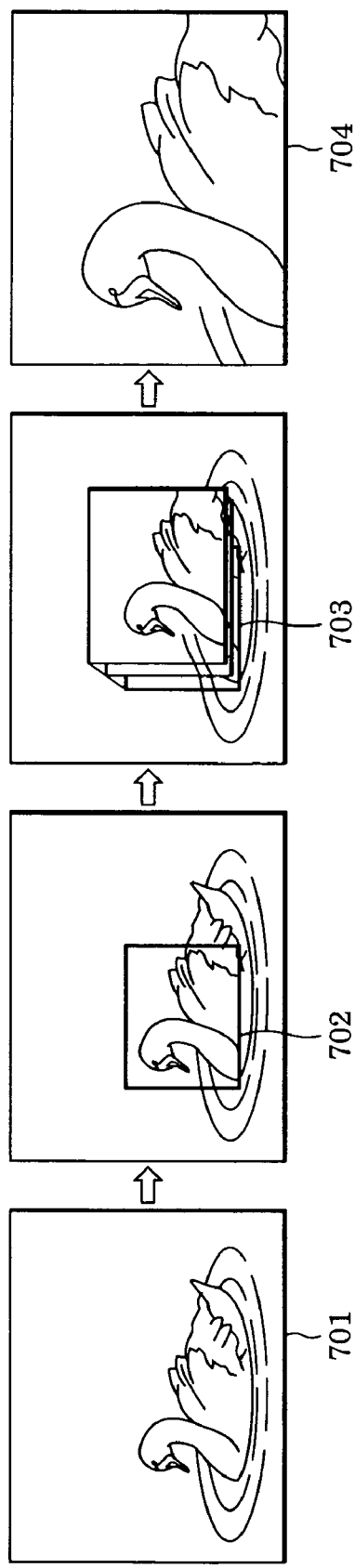
FIG. 7 is a diagram showing an example of the display operation in a trimming frame by using the trimming information in the auto-play operation shown in FIG. 5.

Next, a description is given of the second embodiment of the present invention with reference to FIGS. 5 to 7. FIG. 5 is a flowchart showing the sequence of the auto-play operation using the trimming information in an image processing apparatus according to the second embodiment of the present invention. FIG. 6 is a diagram showing an example of a setting screen for setting whether or not the auto-play operation is performed by using the trimming information shown in FIG. 5. FIG. 7 is a diagram showing an example of the display operation of an intra-trimming frame by using the trimming information in the auto-play operation shown in FIG. 5. Here, the structure according to the second embodiment is the same as that according to the first embodiment and a description thereof is not repeated here. The sequence shown in FIG. 5 is executed by the system control circuit 50.

According to the second embodiment, unlike the first embodiment, it is set whether or not the set trimming frame is displayed and whether or not the display operation of animation is performed in the enlarged display operation of the image in the trimming frame.

According to the second embodiment, a setting screen 601 shown in FIG. 6 is used for setting whether or not the auto-play operation is performed by using the trimming information. The setting screen 601 displays a setting item (display the intra-trimming frame) 602 for setting whether or not the auto-play operation is performed by using the trimming information, a setting item (display the on-trimming frame) 605 for setting the trimming frame is displayed, and a setting item (display enlarged animation) 606 for setting whether or not the animation is displayed in the enlarged display operation of the image in the trimming frame. Here, an ON button 603 is selected for setting the auto-play operation using the trimming information and an OFF button 604 is selected for resetting the auto-play operation. When the auto-play operation is set by using the trimming information, the setting items 605 and 606 are set. When the auto-play operation is reset by using the trimming information, the setting items 605 and 606 are not set.

When the auto-play operation is performed by using the trimming information, referring to FIG. 5, in step S501, the system control circuit 50 sets the image as the processing target to the first one, namely, file No. n to 1. In step S502, the system control circuit 50 displays the image of a file No. n. In step S503, the system control circuit 50 determines whether or not the trimming information is set to the image as the processing target. When the trimming information is set, in step S504, the system control circuit 50 determines whether or not the frame display setting for displaying the trimming frame is on. If it is determined that frame display setting for displaying the trimming frame is on (yes in step S504), in step S505, the system control circuit 50 overlays and displays the trimming frame on the displayed original image. Then, the processing advances to step S506. On the other hand, if frame display setting for displaying the trimming frame is not on, i.e., is off (no in step S504), the system control circuit 50 skips step S505 and advances the processing to step S506.

In step S506, the system control circuit 50 determines whether or not the enlarged animation setting is on for displaying the animation in the enlarging and display operation of the image in the trimming frame. If enlarged animation setting is on (yes in step S506), in step S507, the system control circuit 50 displays the animation of an interpolated image for enlarging and displaying the image in the trimming frame. Then, the processing advances to step S509. If enlarged animation setting is not on, i.e., is off (no in step S506), the system control circuit 50 skips step S507 and then advances the processing to step S509.

In step S509, the system control circuit 50 enlarges and displays the image in the trimming frame. Then, in step S510, the system control circuit 50 determines whether or not the processing ends for all of the images. If processing ends for all of the images (yes in step S510), the system control circuit 50 ends the processing. If processing does not end for all of the images (no in step S510), in step S511, the system control circuit 50 increments the file No. n by one so as to display the image of the next file No. n. Processing then returns to step S502 and the system control circuit 50 displays the image of the file No. n.

If it is determined in step S503 that the trimming information is not set, in step S510, the system control circuit 50 determines whether or not the processing ends for all of the images. If it is determined that processing ends for all of the images (yes in step S510), the system control circuit 50 ends the processing. If it is determined that processing does not end for all of the images (no in step S510), in step S511, the system control circuit 50 increments the file No. n by one so as to display the image of the next file No. n. Processing then returns to step S502 and the system control circuit 50 displays the image of the file No. n.

In the auto-play operation, the entire image 701 (of FIG. 7) of the corresponding file No. n is displayed in step S502. In steps S503 and S504, the trimming information exists in the image 701 and the frame display setting for displaying the trimming frame is ON, a trimming frame 702 indicating the area prescribed by the trimming information is overlaid to the image 701 and is and displayed in step S505. The setting of the enlarged animation is ON in step S506, the interpolated image upon enlarging and displaying the image in the trimming frame is displayed as an animation image 703 in step S507. Then, the image in the trimming frame is enlarged and is displayed as an image 704 in step S509.

The display operation of animation shown in FIG. 7 is one example and the present invention is not limited to this. Further, in place of the display operation of animation, with another specific effect, the process for enlarging and displaying the image in the trimming frame may be displayed.

Third Embodiment

Figure 8:
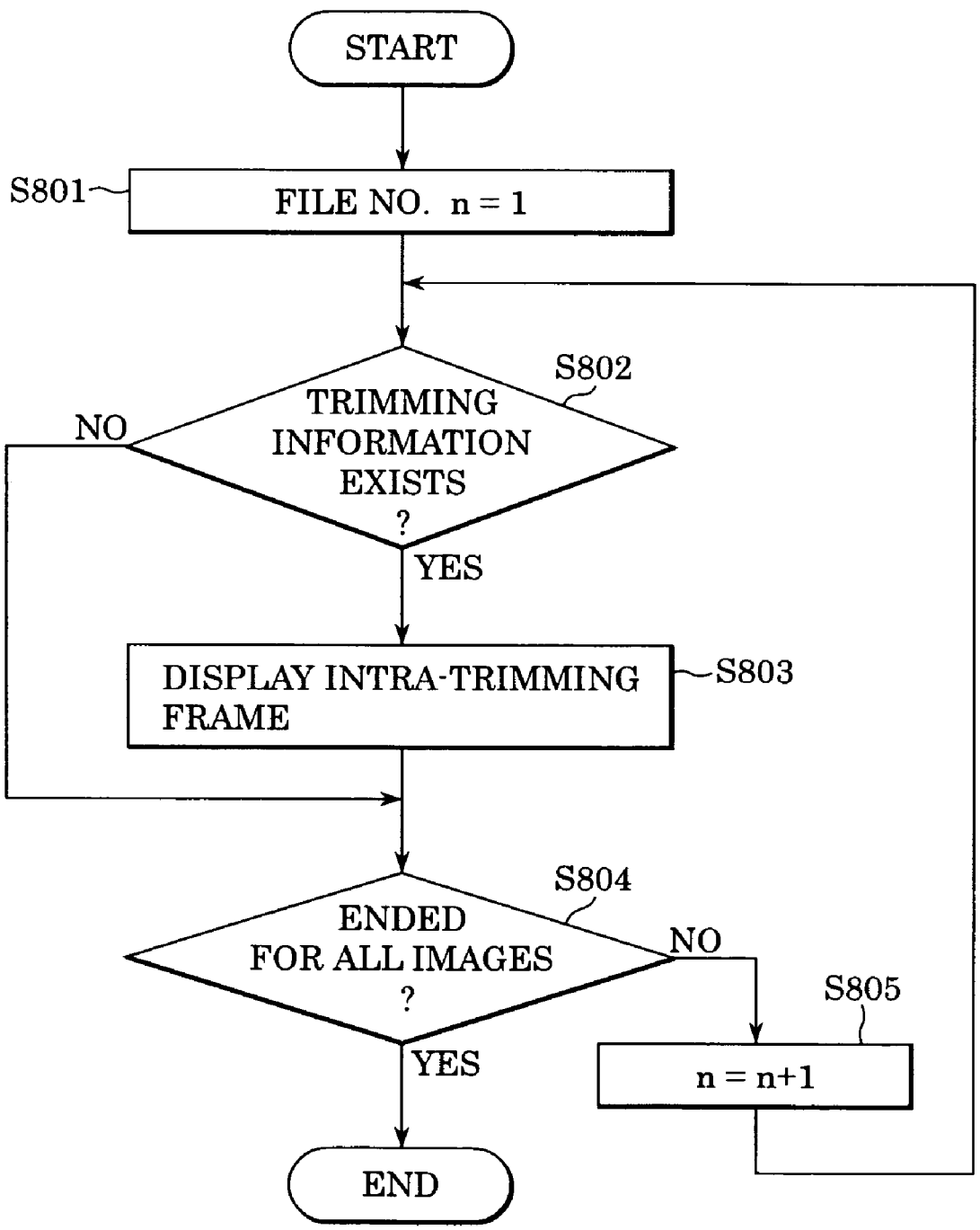
FIG. 8 is a flowchart showing the auto-play operation using the trimming information in an image processing apparatus according to the third embodiment of the present invention.
Figure 9:
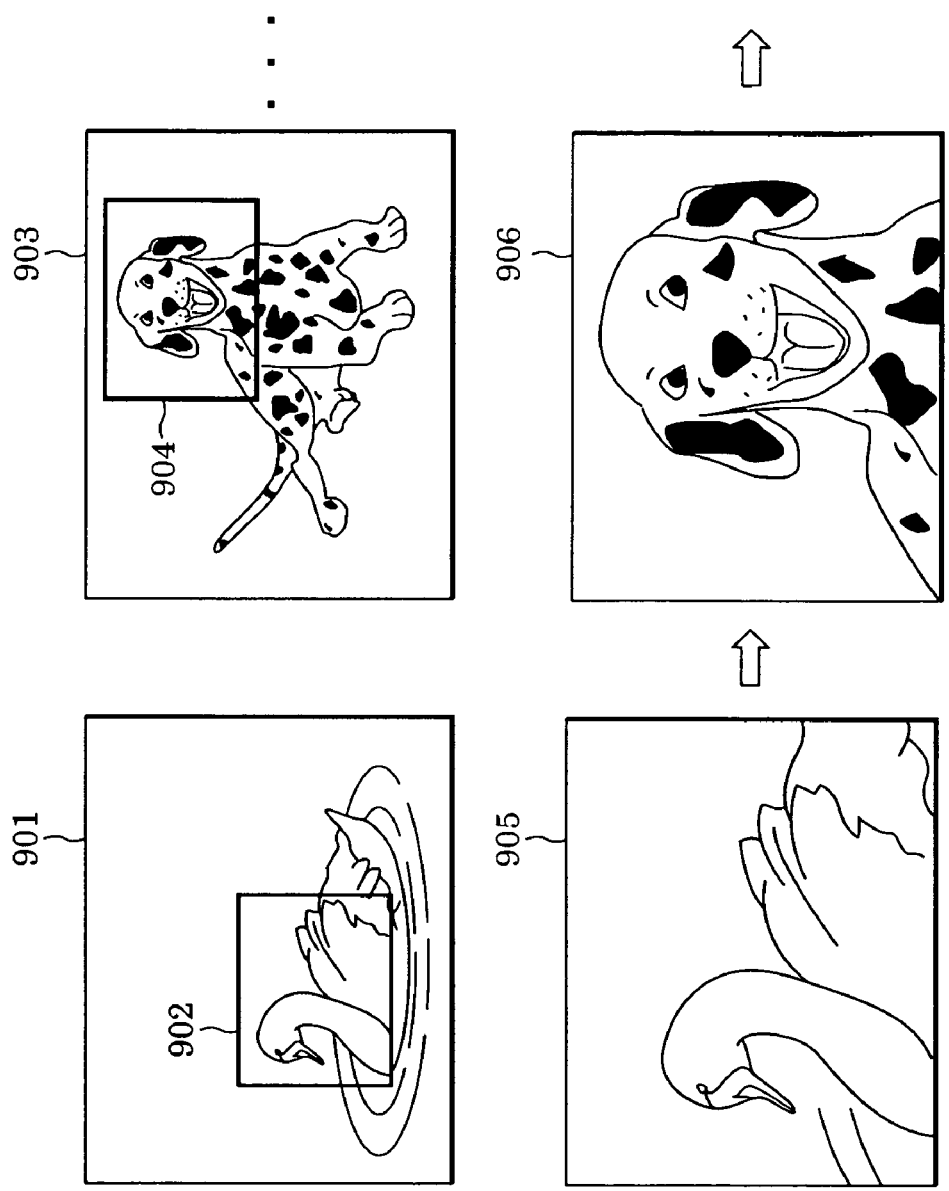
FIGS. 9A and 9B are diagrams showing examples of an image additionally having the trimming information in the auto-play operation shown in FIG. 8 and the played image thereof.

Next, a description is given of the third embodiment of the present invention with reference to FIGS. 8 to 9B. FIG. 8 is a flowchart showing the sequence of the auto-play operation using the trimming information in an image processing apparatus according to the third embodiment of the present invention. FIGS. 9A and 9B are diagrams showing an example of the image additionally having the trimming information as the auto-play operation and a played image thereof. The structure according to the third embodiment is the same as that according to the first embodiment and a description thereof is not repeated here. The sequence shown in FIG. 8 is executed by the system control circuit 50.

According to the third embodiment, unlike the first embodiment, only the image additionally having the trimming information is displayed. That is, the image additionally having no trimming information is not displayed and only the image additionally having the trimming information is displayed. For the image additionally having the trimming information, the image in the trimming frame is enlarged and is displayed.

According to another display method, for the image additionally having the trimming information, the display operation may have three steps. That is, first, the image before the trimming operation is displayed together with the trimming frame. Then, only the image in the area continuously prescribed by the trimming information is displayed or the image in the area is enlarged and displayed. Thus, it is easily understood which area of the original image is trimmed.

In the auto-play operation using the trimming information, in step S801 of FIG. 8, the system control circuit 50 sets the image as the processing target to the first one, namely, the file NO. n to one. In step S802, the system control circuit 50 determines whether or not the trimming information is set to the image as the processing target. When the trimming information is set (yes in step S802), in step S803, the system control circuit 50 enlarges and displays the image in the area prescribed by the trimming information set to the image as the current processing target, namely, in the trimming. Then, the system control circuit 50 advances the processing to step S804. When the trimming information is not set (no in step S802), the system control circuit 50 skips step S803 and advances the processing to step S804.

In step S804, the system control circuit 50 determines whether or not the processing ends for all of the images. If processing ends for all of the images (yes in step S804), the system control circuit 50 ends the processing for all of the images. If processing does not end for all of the images (no in step S804), in step S805, the system control circuit 50 increments the file No. n by one so as to display the image of the next file No. n. Then, the system control circuit 50 repeats the processing from step S802.

In the auto-play operation, referring to FIGS. 9A and 9B, the image is displayed as follows. That is, when trimming information 902 (refer to FIG. 9A) exists in an image 901 of the corresponding file No. n in step S802 the image in the area prescribed by the trimming information is enlarged and is displayed as an image 905 (refer to FIG. 9B) in step S803. Then, the processing shifts for an image 903 of the next file No. n. If trimming information 904 (refer to FIG. 9A) exists in the image 903 in step S802, the image in the area prescribed by the trimming information, that is, the image in the trimming frame is enlarged and is displayed as an image 906 (refer to FIG. 9B) in step S803.

Other Embodiments

According to the present invention, the trimming information is used for the auto-play operation in the printing operation of the printing device. Further, according to the present invention, reducing-ratio information for reducing and printing the entire image and combined image information such as a panorama may be used for the auto-play operation.

Figure 10:
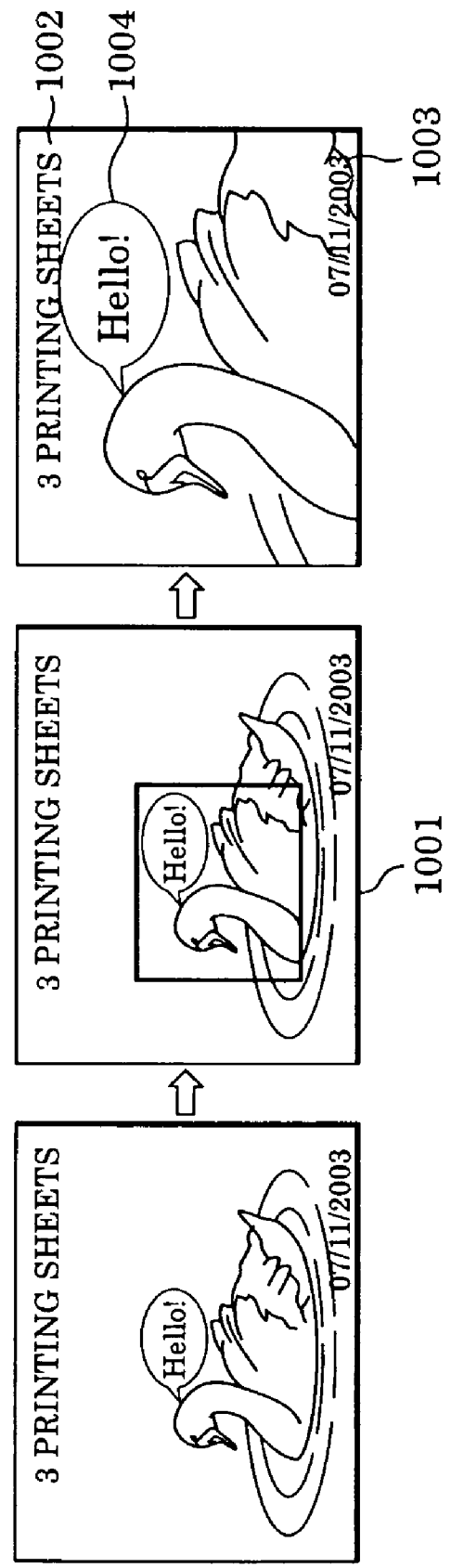
FIG. 10 is a diagram showing an example of the image played based on printing setting information including the trimming information.

In addition to the trimming information, the printing information set on the image processing apparatus 100 as the digital camera includes the number of printing sheets, a simple inserted message, and photographing data information printed together with the image. The printing information is transferred to the printer together with the image data. Referring to FIG. 10, it is possible to superimpose the printing information to information necessary for printing, such as the number of printing sheets 1002, photographing date 1003, and a simple inserted message 1004, together with image data 1001 played based on the trimming information on the monitor of the personal computer (PC) connected to the image display portion 28 or digital camera and to display the information.

A storage medium (recording medium) records program code of software for realizing the flowcharts shown in FIGS. 2, 5, and 8 so as to realize the functions of the embodiments, and includes a flexible disk, a hard disk, a ROM (read-only memory), a RAM (random-access memory), a magnetic tape, a non-volatile memory card, a CD-ROM (compact disk—read-only memory), a CD-R (compact disk—recordable), a DVD (digital versatile disk), an optical disk, a magneto-optical disk, and the like. The present invention is accomplished by supplying the storage medium (recording medium) to a system or an apparatus and by reading and executing the program mode stored therein by a computer (CPU (central processing unit) or MPU (micro-processing unit)) in the system or apparatus. A computer network such as LAN (local area network) or WAN (wide area network) is used for supplying the program code. In this case, the program code supplied from the storage medium or computer network realizes the embodiments, and the present invention can be applied to the storage medium for storing the program code. The functions of the present invention are realized by executing the program code read by the computer. Further, the functions of the embodiments are realized by executing the entire or a part of the actual processing by an operating system (OS) operating on the computer based on an instruction of the program code.

Further, the program code read from the storage medium can be written to a memory of a function expansion card inserted in the computer or a function expansion unit connected to the computer, then, a CPU of the function expansion card or function expansion unit executes the entire or a part of the actual processing based on the instruction of the program code, and the processing realizes the functions of the embodiments. The present invention can be applied to the structure in which a digital camera is physically or electrically connected to the personal computer (PC) by wiring or wireless manner and a picked-up image is displayed on a monitor of the personal computer while the digital camera is remotely operated by the PC.

While the present invention has been described with reference to exemplary embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An image processing apparatus having a recording function to capture an image and record the image on a recording medium and an automatic playback function to read the image recorded on the recording medium and play back automatically, the image processing apparatus comprising:

a trimming information setting unit configured to set, on the image recorded on the recording medium, trimming information for cutting out a part of the image data as a trimming area, such that the image and the trimming information are associated with each other;

a determining unit configured to determine whether the trimming information is set on an image to be displayed by the automatic playback function;

a display control unit configured to control display of the image recorded on the recording medium in an image display area by using the automatic playback function, wherein, if the determining unit determines that the trimming information is not set on the image, the display control unit displays in the image display area the image without an animation, and if the determining unit determines that the trimming information is set on the image, the display control unit displays in the image display area a frame indicating the trimming area on the image displayed, and then an animation where the trimming area is gradually enlarged, and finally the enlarged trimming area; and an animation display setting unit configured to set whether or not an animation is displayed by the display control unit, wherein, in a case where the animation display setting unit sets not to display an animation, when displaying an image on which trimming information is set, the display control unit does not perform the animation and displays the image in the image display area.

2. An image processing apparatus according to claim 1, wherein the display control unit controls displaying of the image data so that the part of the image data cut out based on the trimming information is displayed from the image data to which the trimming information is set.

3. An image processing apparatus according to claim 1, wherein the display control unit controls displaying of the image data so that the part of the image data cut out based on the trimming information is enlarged and is displayed from the image data to which the trimming information is set.

4. An image processing apparatus according to claim 1, wherein the display control unit controls displaying of the image data so that the part of the image data cut out based on the trimming information is enlarged and is displayed from the image data to which the trimming information is set after displaying all of the image data.

5. An image processing apparatus according to claim 1, wherein the display control unit controls displaying of the image data so that all of the image data to which trimming information is set is overlaid to a frame indicating an area of the part of the image data cut out based on the trimming information and is displayed and, thereafter, only the image data cut out based on the trimming information is enlarged and is displayed.

6. An image processing apparatus according to claim 1, wherein the display control unit controls the display so that only the image data to which the trimming information is set is displayed.

7. An image displaying method including recording a captured image on a recording medium, reading the image and automatically playing back the image, the image displaying method comprising:
  setting, on the image recorded on the recording medium, trimming information for cutting out a part of the image data as a trimming area, such that the image and the trimming information are associated with each other;
  determining whether the trimming information is set on an image to be displayed during the automatically playing back of the image;
  controlling display of the image recorded on the recording medium in an image display area during the automatically playing back of the image, wherein, if it is determined in the determining that the trimming information is not set on the image, the controlling comprises displaying in the image display area the image without an animation, and if it is determined in the determining that the trimming information is set on the image, the controlling comprises displaying in the image display area a frame indicating the trimming area on the image displayed, and then an animation where the trimming area is gradually enlarged, and finally the enlarged trimming area; and
  setting whether or not an animation is displayed in the controlling,
  wherein, in a case where the setting whether or not the animation is displayed sets not to display an animation, when displaying an image on which trimming information is set, the controlling comprises not performing the animation and displaying the image in the image display area.

8. An image displaying method according to claim 7, wherein displaying of the image data comprises controlling displaying of the image data so that the part of the image data cut out based on the trimming information is displayed from the image data to which the trimming information is set.

9. An image displaying method according to claim 7, wherein controlling displaying of the image data comprises controlling displaying of the image data so that the part of the image data cut out based on the trimming information is enlarged and is displayed from the image data to which the trimming information is set.

10. An image displaying method according to claim 7, wherein controlling displaying of the image data comprises controlling displaying of the image data so that the part of the image data cut out based on the trimming information is enlarged and is displayed from the image data to which the trimming information is set after displaying all of the image data.

11. An image displaying method according to claim 7, wherein controlling displaying of the image data comprises controlling displaying of the image data so that all of the image data to which trimming information is set is overlaid to a frame indicating an area of the part of the image data cut out based on the trimming information and is displayed and, thereafter, only the image data cut out based on the trimming information is enlarged and is displayed.

12. An image displaying method according to claim 7, wherein controlling displaying of the image data comprises controlling displaying of the image data so that only the image data to which the trimming information is set is displayed.

13. A computer-readable storage medium for storing a computer-readable program for controlling an image processing apparatus according to the image displaying method of claim 7.

14. An image processing apparatus having a recording function to capture an image and record the image on a recording medium and an automatic playback function to read the image recorded on the recording medium and play back automatically, the image processing apparatus comprising:
  a printing-setting-information setting unit configured to set printing setting information for printing the image data recorded to the recording medium with a corresponding relation to the image data, wherein the printing setting information includes trimming information for cutting out a part of the image data as a trimming area, such that the image and the trimming information are associated with each other;
  a determining unit configured to determine whether the trimming information is set on an image to be displayed by the automatic playback function;
  a display control unit configured to control display of the image recorded on the recording medium in an image display area by using the automatic playback function, wherein, if the determining unit determines that the trimming information is not set on the image, the display control unit displays in the image display area the image without an animation, and if the determining unit determines that the trimming information is set on the image, the display control unit displays in the image display area a frame indicating the trimming area on the image displayed, and then an animation where the trimming area is gradually enlarged, and finally the enlarged trimming area; and
  an animation display setting unit configured to set whether or not an animation is displayed by the display control unit,
  wherein, in a case where the animation display setting unit sets not to display an animation, when displaying an image on which trimming information is set, the display control unit does not perform the animation and displays the image in the image display area.

15. An image processing apparatus according to claim 14, wherein the printing setting information includes at least one of a number of printing sheets and date information.

* * * * *